C. G. ETTE.
INSULATOR PIN.
APPLICATION FILED MAR. 1, 1915.
1,163,132.
Patented Dec. 7, 1915.
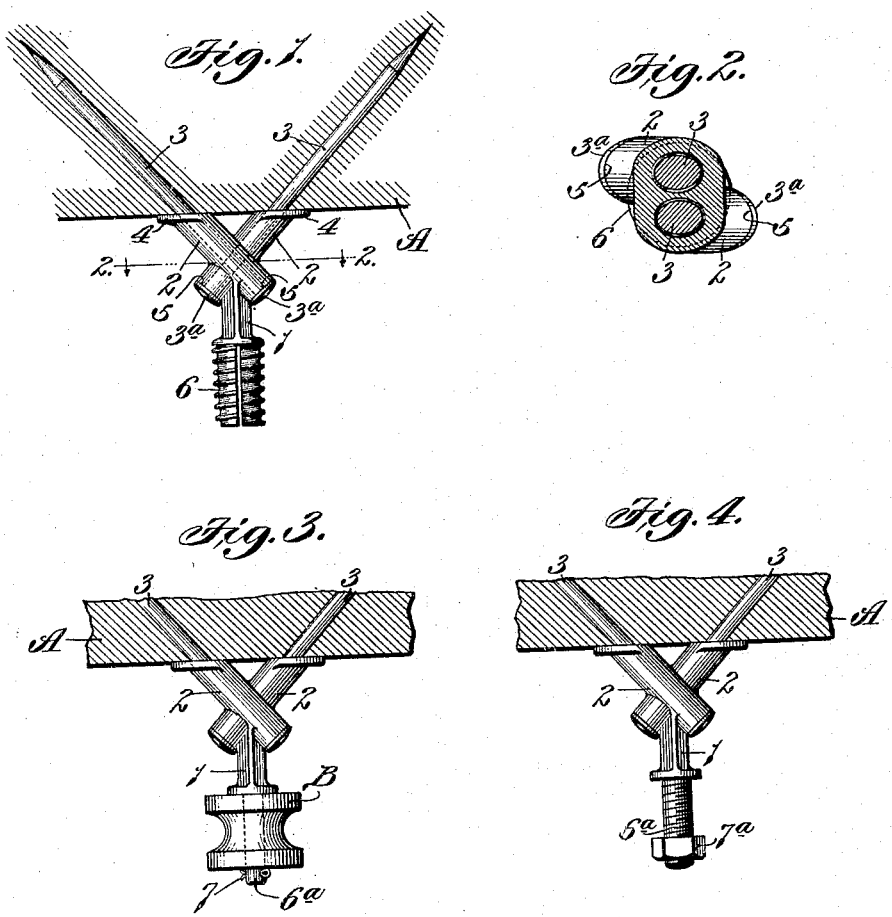
Witnesses:
Geo. R. Ladson
Jms Clark
Inventor,
Charles G. Ette.
By Bakewell Church attys.

UNITED STATES PATENT OFFICE.

CHARLES G. ETTE, OF ST. LOUIS, MISSOURI, ASSIGNOR TO ST. LOUIS MALLEABLE CASTING COMPANY, OF ST. LOUIS, MISSOURI, A CORPORATION OF MISSOURI.

INSULATOR-PIN.

1,163,132.

Specification of Letters Patent. Patented Dec. 7, 1915.

Application filed March 1, 1915. Serial No. 11,319.

*To all whom it may concern:*

Be it known that I, CHARLES G. ETTE, a citizen of the United States, residing at St. Louis, Missouri, have invented a certain new and useful Improvement in Insulator-Pins, of which the following is a full, clear, and exact description, such as will enable others skilled in the art to which it appertains to make and use the same.

This invention relates to insulator pins, and has for its main object to provide an inexpensive insulator pin that can be quickly attached and securely connected to a supporting structure.

Another object is to provide a practicable and efficient insulator pin for mines which can be securely connected to the wall or ceiling of a mine shaft by spikes or other similar non-screw-threaded fastening devices.

Figure 1 of the drawings is a front elevational view, illustrating an insulator pin constructed in accordance with my invention, arranged in operative position on a supporting structure. Fig. 2 is a horizontal sectional view taken on the line 2—2 of Fig. 1; and Figs. 3 and 4 are front elevational views, illustrating slight modifications of my invention.

Briefly described, my improved insulator pin consists of a shank or body portion preferably formed of cast metal and provided with a plurality of oppositely-inclined holes or openings through which fastening devices can be inserted at an angle to each other and also at an angle to the shank, so as to securely connect the pin to a supporting structure. By arranging the fastening devices in this manner I eliminate the possibility of the fastening devices being pulled out of the supporting structure by a longitudinal pull or strain on the shank of the pin, or by a cross pull or strain on the shank, owing to the fact that all of the fastening devices are arranged at an angle to the shank of the pin and are also inclined oppositely to each other.

In the form of my invention shown in Figs. 1 and 2 the shank 1 of the pin is provided at its base or inner end with a substantially X-shaped portion, each of whose legs 2 has a hole extending through same to receive a fastening device 3. The legs 2 lie in different vertical planes, so that the fastening device openings in same will lie on opposite sides of the center axis of the pin and will not intersect with each other, as shown in Fig. 2. The fastening devices 3 that pass through said openings are disposed at an angle to the shank 1 of the pin and they cross each other and are inclined in opposite directions. At one end of each of the legs 2 is a flange 4 that is disposed at right angles to the longitudinal axis of the pin, so as to form a bearing surface of relatively great area at the base of the pin which bears squarely on the supporting structure A, and at the opposite end of each of said legs 2 is a shoulder 5 which is so disposed that the head $3^a$ of the fastening device that passes through the opening in said leg will bear squarely on said shoulder. The shank 1 of the pin merges into the X-shaped portion formed by the oppositely-inclined legs 2, and said shank may be of any preferred shape in cross section, the shank herein shown being substantially cruciform-shaped in cross section.

The shank 1 may either be provided with an integral, externally screw-threaded head 6, as shown in Fig. 1, onto which an insulator can be screwed, or the shank can be provided with an integral extension $6^a$ on which an insulator B can be held by means of a cotter pin 7, as shown in Fig. 3, or by means of a nut $7^a$, as shown in Fig. 4, it being immaterial, so far as my present invention is concerned, what type of insulator is used or how the insulator is held in operative position on the shank of the pin. Any suitable kind of fastening device may be used for securing the pin to the supporting structure, but I prefer to use long spikes or non-screw-threaded fastening devices 3, as shown in Fig. 1, on account of the fact that such fastening devices can be driven into the supporting structure quickly and easily and they will hold the pin as securely as screw-threaded fastening devices, in view of the fact that they are so disposed with relation to each other and with relation to the shank of the pin that they will not pull out of the supporting structure when the pin is subjected to a longitudinal pull or strain or to a cross strain. In other words, the fastening devices 3 diverge in opposite directions or flare outwardly from the point where they enter the supporting structure, and consequently, a longitudinal pull or strain on the pin merely exerts a cross pull or strain on the fastening devices 3, which, of course, will not pull the fastening devices out of the supporting structure. If the pin is subjected to a cross strain or pull or to a strain in a direction substantially in line with one of the fastening devices 3 the other fastening device will counteract or take up the strain, in view of the fact that it is inclined oppositely to the direction in which the strain or pull is applied.

An insulator pin of the construction above described can be manufactured cheaply, in view of the fact that it is formed entirely of cast metal, and non-screw-threaded fastening devices can be used for securing it in position; it can be attached quickly to the supporting structure, owing to the fact that the fastening device can be driven into the supporting structure instead of screwed into same; the fastening devices which hold it in position are so disposed that there is little danger of said fastening devices pulling out of the supporting structure, and as the shank of the pin is provided at its base end with a substantially V-shaped portion that bears firmly against the supporting structure at points on each side of the longitudinal axis of the pin, there is little liability of the shank being tilted either to one side or the other by an abnormal cross strain or pull on the shank. An insulator pin of this construction is adapted for general use, but it is particularly adapted for use in mines, owing to the fact that it can be securely connected to the wall or ceiling of a mine shaft by means of two spikes that can be driven into position quickly and which are so disposed that they will hold the pin securely, even in comparatively soft soil, such, for example, as clay.

Having thus described my invention, what I claim, and desire to secure by Letters Patent, is:

1. An insulator pin, comprising a shank or body portion provided with oppositely inclined openings for receiving fastening devices that cross each other at the longitudinal center line of the shank.

2. An insulator pin, comprising means for supporting an insulator, and a shank provided with oppositely inclined openings for receiving fastening devices which secure the pin to the structure on which it is mounted, said openings crossing each other at the longitudinal center line of the shank.

3. An insulator pin, comprising a shank provided at its base end with a bearing surface which is disposed at substantially right angles to the longitudinal axis of the shank, and portions on said shank having oppositely inclined openings therein for receiving fastening devices.

4. An insulator pin, comprising a shank provided with oppositely inclined fastening device openings which cross each other but do not intersect.

5. An insulator pin, comprising a shank provided with diverging legs whose outer ends bear against the supporting structure, each of said legs having an opening extending through same for receiving a fastening device.

6. An insulator pin, comprising a shank provided with diverging legs that have flanges or portions which bear firmly on the supporting structure to which the pin is connected, said legs being provided with openings for receiving fastening devices which are inclined oppositely to each other.

7. An insulator pin, comprising a shank formed integral with a substantially X-shaped portion, each leg of which has an opening extending therethrough for receiving a fastening device.

8. An insulator pin, comprising a shank formed integral with a substantially X-shaped portion, each leg of which has an opening extending therethrough for receiving a fastening device, and the openings in said legs being so arranged that they cross each other but do not intersect.

9. An insulator pin, comprising a shank provided with a substantially X-shaped portion, each leg of which has an opening therethrough for receiving a fastening device, shoulders at the inner ends of said legs against which the heads on the fastening devices bear, and flanges at the outer ends of said legs which bear against the supporting structure to which the pin is attached.

10. An insulator pin, comprising a shank, means on one end of said shank for supporting an insulator, and diverging legs on the other end of said shank having openings extending longitudinally through same for receiving fastening devices that are disposed at an angle to each other and also at an angle to the shank of the pin.

11. An insulator pin, comprising a shank provided at one end with a portion to which an insulator can be connected, diverging legs formed integral with said shank, each of which has an opening extending therethrough for receiving a fastening device, and flanges at the outer ends of said legs which are disposed approximately at right angles to the longitudinal axis of the pin.

In testimony whereof I hereunto affix my signature in the presence of two witnesses, this twenty-sixth day of February, 1915.

CHARLES G. ETTE.

Witnesses:
WILLIAM L. SCHROEDER,
WALTER C. RAITHEL.